United States Patent
Holweck et al.

(10) Patent No.: US 8,487,559 B2
(45) Date of Patent: Jul. 16, 2013

(54) DIESEL-ELECTRIC DRIVE SYSTEM

(75) Inventors: Andreas Holweck, Erlangen (DE); Olaf Körner, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 208 days.

(21) Appl. No.: 12/992,373

(22) PCT Filed: Mar. 27, 2009

(86) PCT No.: PCT/EP2009/053657
§ 371 (c)(1),
(2), (4) Date: Nov. 12, 2010

(87) PCT Pub. No.: WO2009/138291
PCT Pub. Date: Nov. 19, 2009

(65) Prior Publication Data
US 2011/0062778 A1   Mar. 17, 2011

(30) Foreign Application Priority Data
May 13, 2008  (DE) .......................... 10 2008 023 332

(51) Int. Cl.
*H02K 7/10* (2006.01)
*H02P 3/12* (2006.01)
(52) U.S. Cl.
CPC ..................................... *H02P 3/12* (2013.01)
USPC ............................ 318/362; 318/375; 318/376
(58) Field of Classification Search
CPC ................................................... H02P 3/12
USPC ............................................ 318/362, 375, 376
See application file for complete search history.

(56) References Cited

U.S. PATENT DOCUMENTS

| | | | | |
|---|---|---|---|---|
| 6,005,786 A * | 12/1999 | Bluemel et al. | ................. | 363/70 |
| 7,185,591 B2 * | 3/2007 | Kumar et al. | ................... | 105/35 |
| 8,063,612 B2 * | 11/2011 | Amler | ............................ | 322/46 |

FOREIGN PATENT DOCUMENTS

| DE | 102006010536 A1 | 9/2007 |
|---|---|---|
| DE | 102007003172 A1 | 2/2008 |
| DE | 102006051337 A | 5/2008 |

\* cited by examiner

*Primary Examiner* — Walter Benson
*Assistant Examiner* — David Luo
(74) *Attorney, Agent, or Firm* — Henry M. Feiereisen LLC

(57) ABSTRACT

A diesel-electric drive system includes a generator having two multi-phase winding systems, a diesel engine, and a DC-link converter. Two self-commuted pulse power converters on the generator side are linked to the windings systems and to each other by a brake resistor on the alternating voltage side. The brake resistor is split into two series-connected resistors, each having half the resistance value of the brake resistor. An input of a bipolar switching device is connected to a connecting point of two series-connected resistors. The capacity of the diesel motor can then be checked in a self-load test with a controllable load torque of the diesel-electric drive system, while eliminating overloads of the power semiconductors of the self-commuted pulse power converters on the generator side.

10 Claims, 6 Drawing Sheets

DIESEL-ELECTRIC DRIVE SYSTEM

CROSS-REFERENCES TO RELATED APPLICATIONS

This application is the U.S. National Stage of International Application No. PCT/EP2009/053657, filed Mar. 27, 2009, which designated the United States and has been published as International Publication No. WO 2009/138291 A1 and which claims the priority of German Patent Application, Serial No. 10 2008 023 332.3, filed May 13, 2008, pursuant to 35 U.S.C. 119(a)-(d).

BACKGROUND OF THE INVENTION

The invention relates to a diesel-electric drive system and to a method for stationary load testing of a diesel engine of the diesel-electric drive system.

A diesel-electric drive system of this generic type is known from DE 10 2007 003 172 A1 and is illustrated in more detail in the form of an equivalent circuit in FIG. 1. In this equivalent circuit, 2 denotes a diesel engine, 4 a generator, in particular a permanent-magnet synchronous generator, 6 a DC-link converter and 8 a rotating-field machine, in each case, in particular a polyphase asynchronous machine. The DC-link converter 6 has two self-commutated pulse-controlled converters 10 and 12 on the generator side, and two self-commutated pulse-controlled converters 14 and 16 on the load side. These self-commutated pulse-controlled converters 10, 12 and 14, 16 are electrically conductively connected to one another on the DC voltage side by means of a DC-link capacitor 18, in particular a DC-link circuit 20 having a DC-link capacitor bank. The generator 4 has polyphase winding systems 22 and 24, which are each linked by means of a circuit breaker 26 and 28 to connections R1, S1, T1 and R2, S2, T2 on the AC voltage side of the two generator-side self-commutated pulse-controlled converters 10 and 12. The corresponding connections R1 and R2, S1 and S2, and T1 and T2 on the AC voltage side are each electrically conductively connected to one another by means of a braking resistor 30. The method of operation of this diesel-electric drive system, in particular the braking mode, is described in detail in DE 10 2007 003 172 A1, and therefore does not need to be described at this point. FIG. 2 likewise illustrates in more detail an equivalent circuit of the diesel-electric drive system. This diesel-electric drive system differs from the diesel-electric drive system shown in FIG. 1 in that implementations are indicated for the generator-side and load-side self-commutated pulse-controlled converters 10, 12 and 14, 16. These self-commutated pulse-controlled converters 10, 12, 14 and 16 are implemented by means of double-converter bridge arm modules 32. FIG. 3 shows an equivalent circuit of this double-converter bridge arm module 32 in more detail. The two generator-side self-commutated pulse-controlled converters 10 and 12 are implemented with the aid of three double-converter bridge arm modules 32 while, in contrast, three double-converter bridge arm modules 32 are used for implementation of each load-side self-commutated pulse-controlled converter 14 or 16. Nine double-converter bridge arm modules 32 are therefore connected in order to provide the DC-link converter 6 for the diesel-electric drive system.

According to the equivalent circuit of the double-converter bridge arm module 32 shown in FIG. 3, this double-converter bridge arm module 32 has two bridge arm modules 34 which are connected electrically in parallel on the DC voltage side. Each bridge arm module 34 has two semiconductor switches 36 and 38 which can be turned off and are connected electrically in series, in particular Insulated Gate Bipolar Transistors (IGBTs), which are each provided with a corresponding free-wheeling diode 40 or 42. A connection point between two semiconductor switches 36 and 38, which can be turned off and are connected electrically in series, in each case forms a connection of R1 and R2, S1 and S2, and T1 and T2 on the AC voltage side. The connections 44 and 46 on the DC voltage side of each double-converter bridge arm module 32 are each electrically conductively connected to a potential in the DC-link circuit 20 in the DC-link converter 6.

In the case of diesel-electric traction drives, for example diesel locomotives or mining trucks, the generator 4 which is fitted to this diesel engine 2 is used to supply energy for the drive motors 8. The electrical voltage of the generator 4 is changed by the generator-side self-commutated pulse-controlled converters 10 and 12 to a predetermined DC-link voltage, from which the load-side self-commutated pulse-controlled converters 14 and 16 supply the drive motors 8. During electrical braking, the power flow in the DC-link converter 6 is precisely reversed. The energy is supplied into the DC-link circuit 20 of the converter 6 through the load-side self-commutated pulse-controlled converters 14 and 16. Since the diesel engine 2 cannot absorb braking energy, the braking energy must be converted to heat by means of the braking resistors 30. For continuous power distribution, a voltage which is pulse-width-modulated by the two self-commutated pulse-controlled converters 10 and 12 is passed to the braking resistors 30.

In order to make it possible to check the performance of the diesel engine 2, for example after repair, a so-called self-load test is carried out (stationary load test on an internal combustion engine). In the case of mining trucks and Eastern-European and North American diesel locomotives, this self-load test is already standard. In the case of diesel-electric drive systems which have a synchronous generator with an electrically produced field and a downstream diode rectifier, this self-load test is carried out when the vehicle is stationary via the braking resistors, which are fed from the DC-link circuit by means of a converter, in particular a chopper. Since the performance of the electrical brakes in these vehicles in general corresponds at least to the diesel engine power when driving, a stationary load test such as this cannot be carried out without an additional device.

A diesel-electric drive system of this generic type does not allow a self-load test to be carried out up to the maximum diesel engine power without more powerful semiconductor switches, since a self-load test:
a) on the one hand must feed the entire diesel engine power electrically into the DC-link circuit of the DC-link converter as a current fundamental, and
b) this power must be simultaneously transmitted in the opposite direction out of this DC-link circuit again, in the form of current harmonics, by means of the braking resistors.

This leads to overloading of the power electronics in the diesel-electric drive system when the current fundamental amplitude has the current harmonics superimposed on it at specific switching times.

In order nevertheless to allow a self-load test to be carried, out on this diesel-electric drive system of this generic type, it would be necessary to install an additional braking chopper in the DC-link circuit of the DC-link converter, which braking chopper would have to be designed for 50% of the total braking power. This additional braking chopper would not only cause additional costs but would also increase the weight of the traction converter. Furthermore, sufficient space to allow the additional converter to be accommodated would have to be provided on a diesel-electric locomotive or a mining truck.

The invention is now based on the object of improving the diesel-electric drive system of this generic type such that there is no need for an additional braking chopper in order to carry out a self-load test.

SUMMARY OF THE INVENTION

According to the invention, this object is achieved by a diesel-electric drive system with a generator having a rotor mechanically coupled to a diesel engine and a stator having two polyphase winding systems, a DC-link converter having two self-commutated pulse-controlled converters, wherein phases of each of the two polyphase winding systems are connected to corresponding phases on an AC voltage side of a corresponding self-commutated pulse-controlled converter, and wherein DC voltage sides of the two self-commutated pulse-controlled converters are connected in parallel to a DC-link capacitor of the DC-link converter, two resistors connected in series between a phase on the AC voltage side of one of the two self-commutated pulse-controlled converters and a corresponding phase on the AC voltage side of the other pulse-controlled converter, and a two-pole switching apparatus having a first switching state connecting the two resistors in each phase in series and a second switching state disconnecting the series connection of the two serially connected resistors in each phase and connecting the phases of each of the two polyphase winding systems separately via the resistors at a star point, wherein each of the two serially-connected resistors has a resistance value equal to one half of a resistance value of an equivalent braking resistor.

Since each braking resistor is split into two resistors which are electrically connected in series, and each junction point between two resistors which are electrically connected in series is linked to an input of a two-pole switching apparatus with a star-point form, the two polyphase systems comprising the generator-stator winding-pulse-controlled converter are decoupled, and each system has an associated polyphase resistor with half the resistance value of the braking resistor. In these decoupled diesel-electric drive systems, the natural braking characteristic of the generator, in particular of the permanent-magnet synchronous generator, can now be used in the self-load test, the characteristic of which depends, however, on the rotation speed and the value of the three-phase resistance, in addition to the machine parameters themselves.

This characteristic can be influenced by closed-loop reactive-current control. In the simplest case, capacitors would be connected in parallel with the resistors, thus making it possible to produce a capacitive reactive current. However, this would lead to an increase in the braking torque over the rotation speed. In addition to further additional components (capacitors) which would not be required for driving and braking operation of the vehicle, this arrangement would be unregulated.

According to the invention, this decoupled diesel-electric drive system is operated by breaking the series connection of two resistors and electrically connecting the resistors in each subsystem at a star point, clocking the two generator-side self-commutated pulse-controlled converters synchronously, and operating each in the phase-shifter mode. This results in a regulated reactive current in each case being generated from the charged voltage intermediate circuit in the voltage intermediate-circuit converter. A braking torque can be set at each rotation-speed point by closed-loop control of the reactive current, thus following a required torque curve of the diesel engine during the self-load test.

The inventive step is to use a simple and low-cost two-pole switching apparatus with a star-point former in conjunction with closed-loop reactive-current control with the existing generator-side, self-commutated pulse-controlled converters. This development according to the invention of the known diesel-electric drive system allows a self-load test with a regulated load torque to be carried out on this drive system, in which the abovementioned disadvantages no longer occur.

BRIEF DESCRIPTION OF THE DRAWING

In order to explain the invention further, reference is made to the drawing, which schematically illustrates one embodiment of the diesel-electric drive system according to the invention, and in which.

DETAILED DESCRIPTION OF PREFERRED EMBODIMENTS

Figure 1:
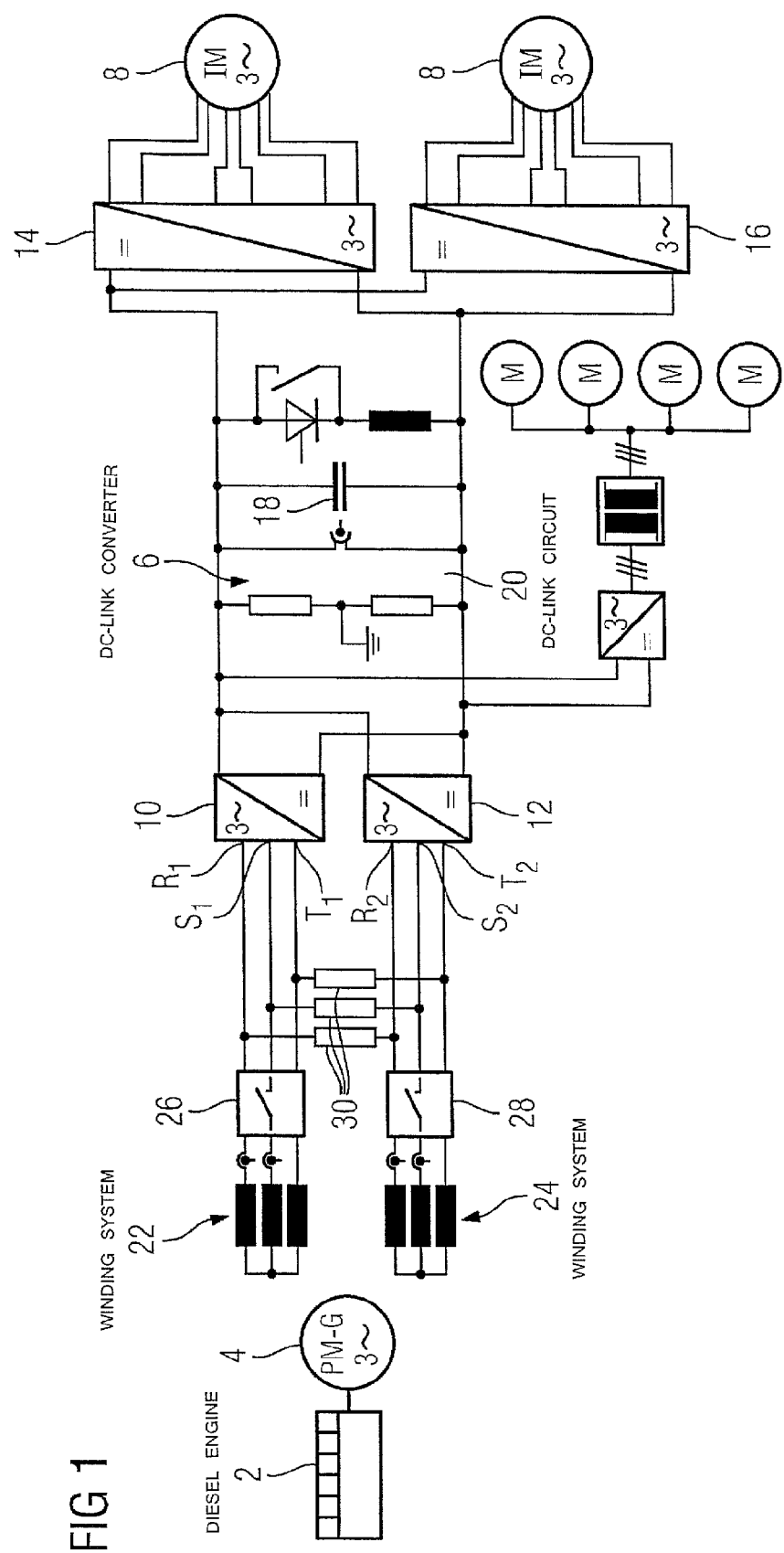
FIG. 1 shows an equivalent circuit of a diesel-electric drive system of this generic type.
Figure 2:
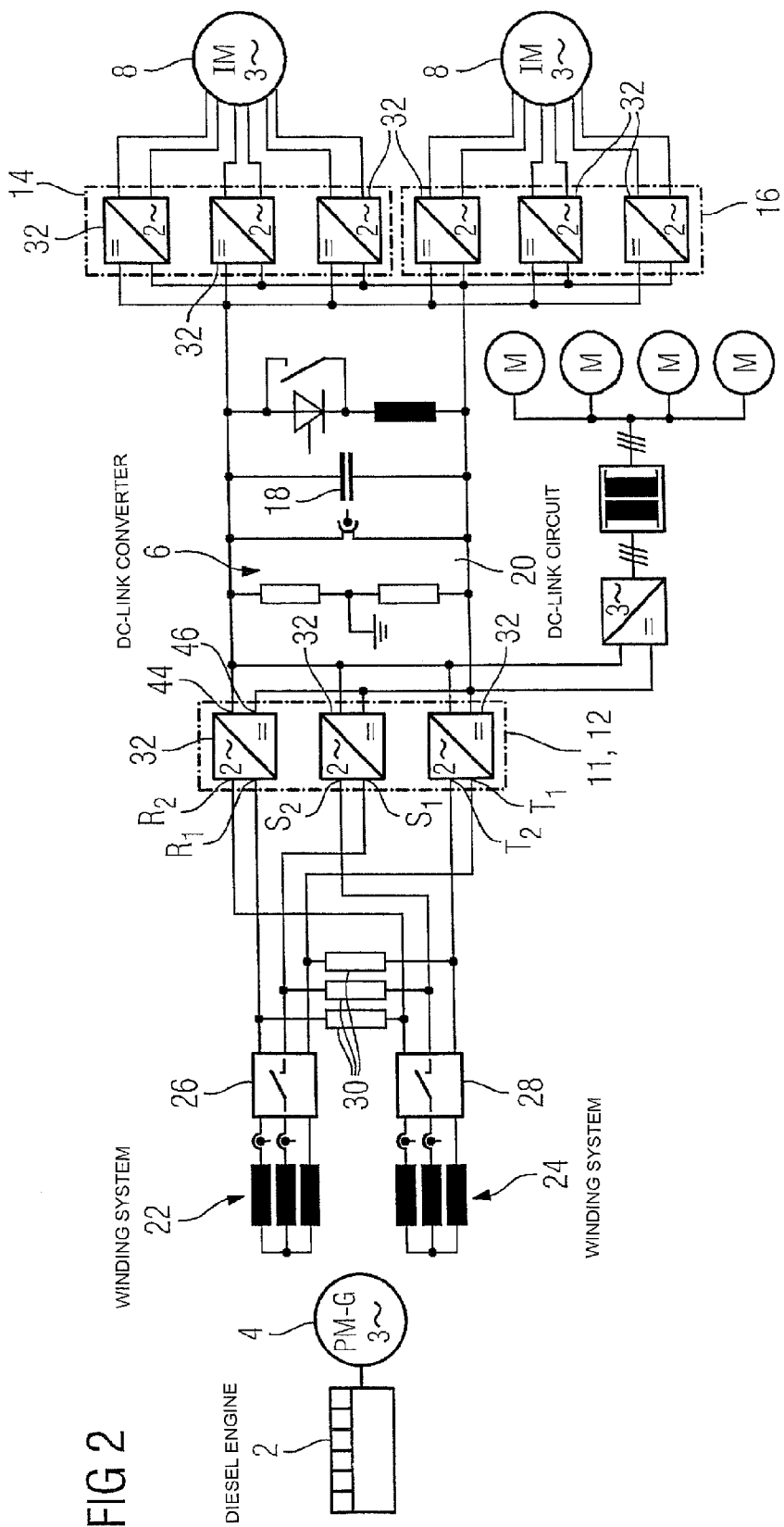
FIG. 2 shows an equivalent circuit of one implementation of the drive system shown in FIG. 1.
Figure 3:
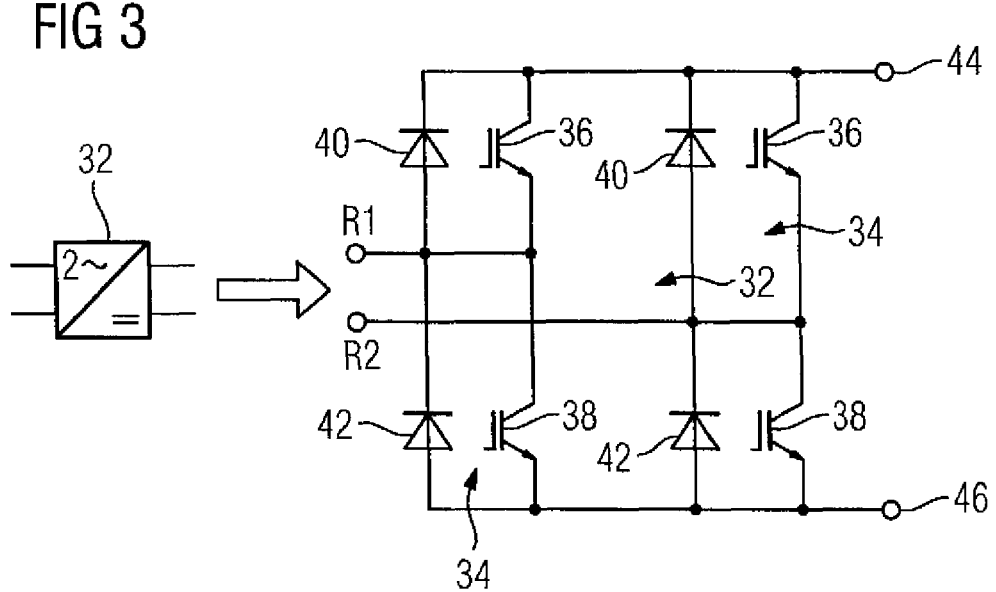
FIG. 3 shows an equivalent circuit of a double-converter bridge module for the self-commutated pulse-controlled converters in the drive system shown in FIG. 2.
Figure 4:
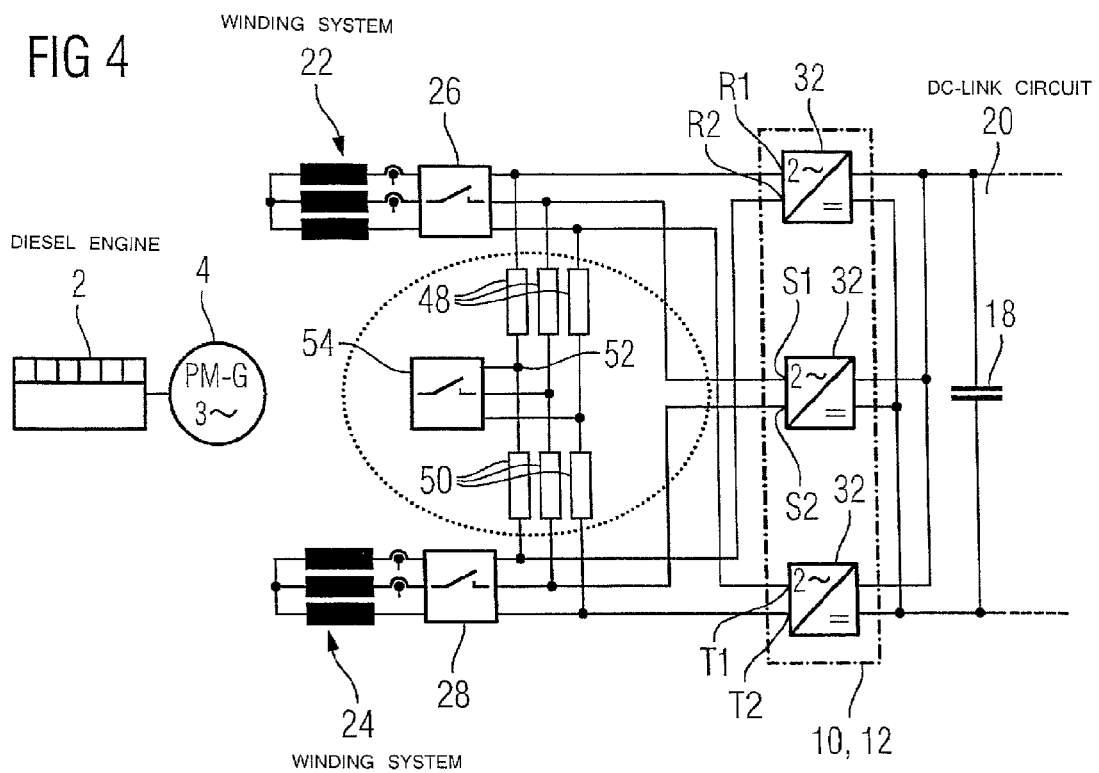
FIG. 4 shows an equivalent circuit with one embodiment of a diesel-electric drive system according to the invention.
Figure 5:
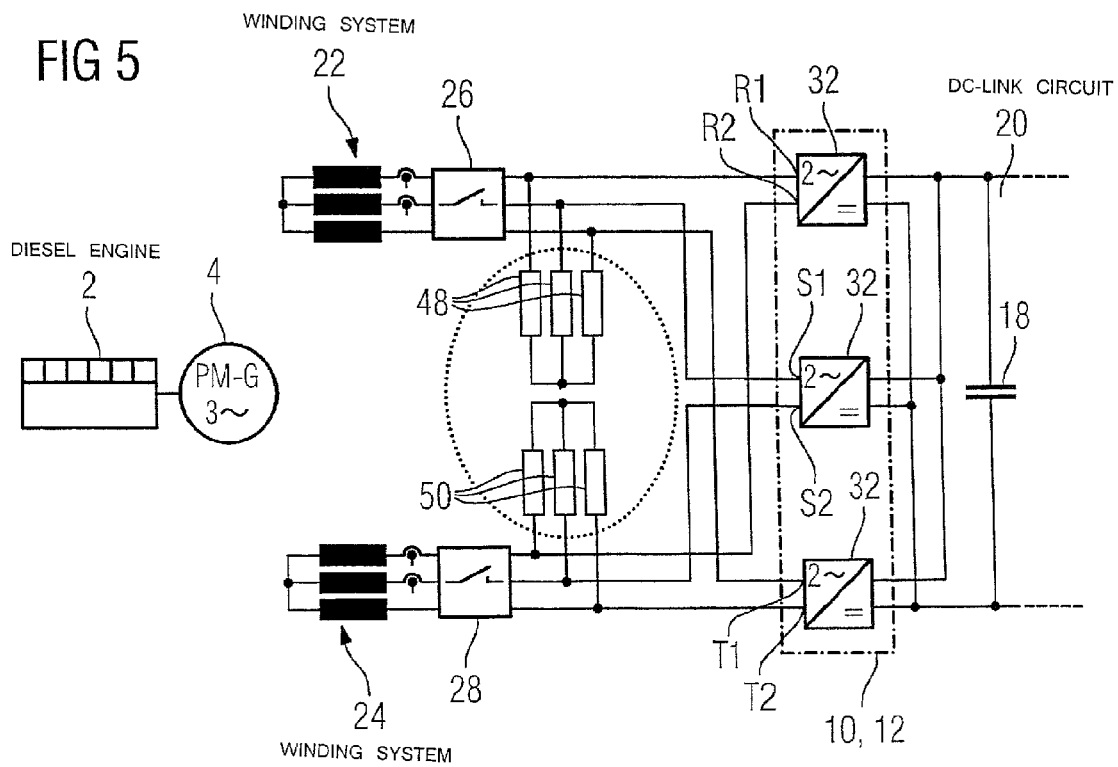
FIG. 5 shows the embodiment of the diesel-electric drive system shown in FIG. 4 in the decoupled state, FIG. 6 uses a graph to show braking characteristics, which differ with the rotation speed, for a permanent-magnet synchronous machine, FIG. 7 uses a graph to show current waveforms, plotted against time, for clocking the generator-side self-commutated pulsed-controlled converters 9 times, during self-load tests, while in contrast FIG. 8 uses a diagram to show current waveforms, plotted against time, for block clocking the generator-side, self-commutated pulse-controlled converters during a self-load test.

The embodiment of a diesel-electric drive system according to the invention as shown in FIG. 4 in each case has two resistors 48 and 50, which are electrically connected in series, as the braking resistor 30. The resistance value of each resistor 48 or 50 is equal to half the resistance value of the braking resistance 30 in the drive system shown in FIG. 1. This means that the braking resistor 30 is split into two resistance components which are electrically connected in series. Each connection point 52 between two resistors 48 and 50 which are electrically connected in series is linked to one input of a two-pole switching apparatus 54. This two-pole switching apparatus 54 splits each series circuit by two resistors 48 and 50, with the resistors 48 and 50 at the same time being electrically connected in star. The result of the operation of the two-pole switching apparatus 54 is illustrated in more detail in FIG. 5. This development according to the invention decouples the two systems comprising the generator 4—winding system 22 and 24—self-commutated pulse-controlled converters 10 and 12, and associates the resistors 48 and 50 with each system.

Figure 6:
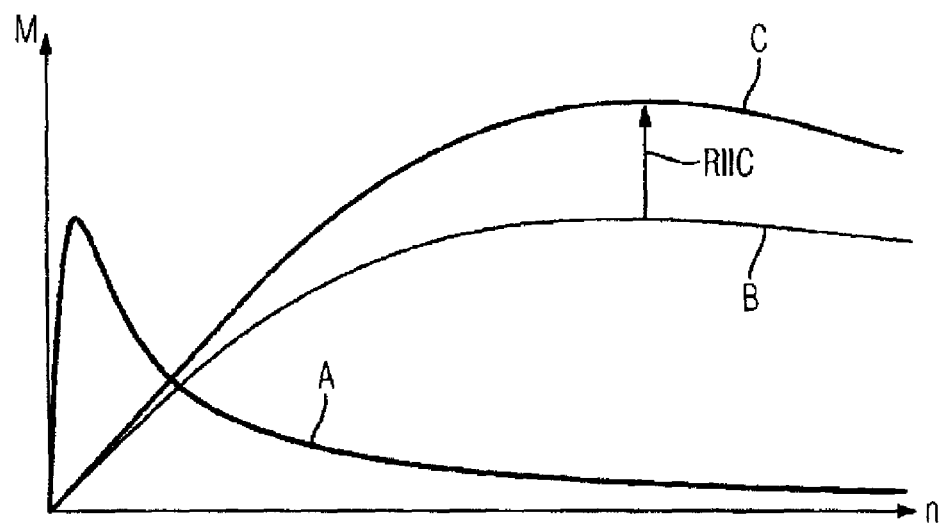

This circuit which is now created (FIG. 5) allows the natural braking characteristic A (generator torque), as illustrated in FIG. 6, of a permanent-magnet synchronous machine to be used in a self-load test. This natural braking characteristic A is, however, dependent on the rotation speed n and the value of the stator resistance of the generator 4 in addition to the machine parameters. It would be purely accidental if this braking characteristic A were to correspond to the torque characteristic of the diesel engine 2 of the diesel-electric drive system shown in FIG. 4. The graph in FIG. 6 likewise shows a natural braking torque characteristic B plotted against the rotational speed n, as occurs when a braking resistor 48 or 50 is used. This means that, in the case of the braking torque characteristic A, only the stator resistance of the permanent-magnet synchronous motor is effective whereas, in the case of the braking torque characteristic B, the series circuit formed by the stator resistance of the permanent-magnet synchronous motor and the additional resistor 48 and 50 becomes effective. The increased resistance value shifts the position of the maximum generator torque.

As already mentioned, the characteristic can be influenced by closed-loop reactive current control. In the simplest case, the capacitors would have to be connected electrically in parallel with the resistors 48 and 50. These capacitors would increase the braking torque over the rotation speed n. A corresponding braking torque characteristic C is shown, plotted against the rotation speed n, in the graph in FIG. 6. However, this arrangement would be unregulated and would necessitate additional capacities, which would not be necessary for driving and braking operation of the vehicle.

Instead of using non-variable capacitors for producing reactive current, according to the invention, the two generator-side self-commutated pulse-controlled converters 10 and 12 in the DC-link converter 6 in the diesel-electric drive system are used in the phase-shifter mode. The use of these self-commutated pulse-controlled converters 10 and 12 in the phase-shifter mode results in a reactive current that is provided being produced from the charged DC-link capacitor 18 in the DC-link converter 6. A braking torque can be set at each rotation speed point by closed-loop control of this reactive current, thus following a required torque curve of the diesel engine 2 in the diesel-electric drive system, during the self-load test.

In the phase-shifter mode, the clocked pulse-controlled converters 10 and 12 also feed current harmonics to the braking resistors 48 and 50, because of voltage harmonics. This real power, which has to be taken from the DC-link circuit 20 of the DC-link converter 6 in this diesel-electric drive system, must be taken into account in the overall budget of the drive system, in order to allow closed-loop control of the power dissipated in the braking resistors 48 and 50. However, the current harmonics are sufficiently small that they do not lead to overloading of the power semiconductors in the two self-commutated pulse-controlled converters 10 and 12. During the self-load test, auxiliary modes can be supplied with power from the DC-link circuit 20, in order to allow fans and/or a cooling system to be operated.

Figure 7:
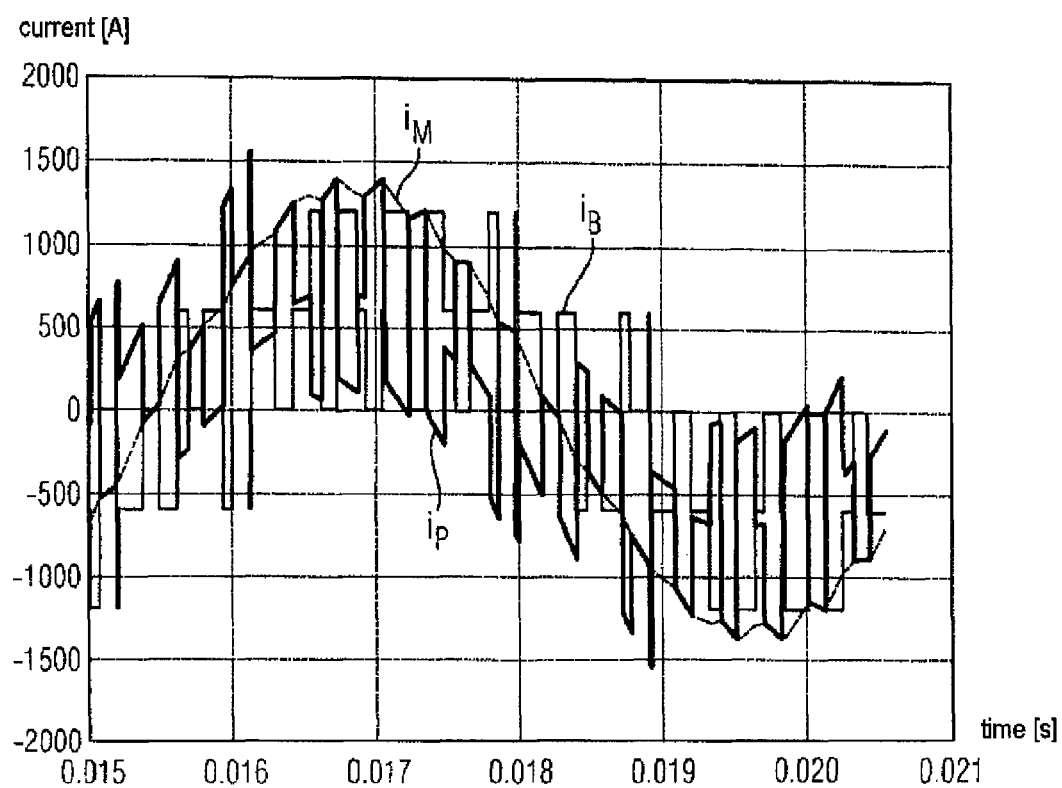
Figure 8:
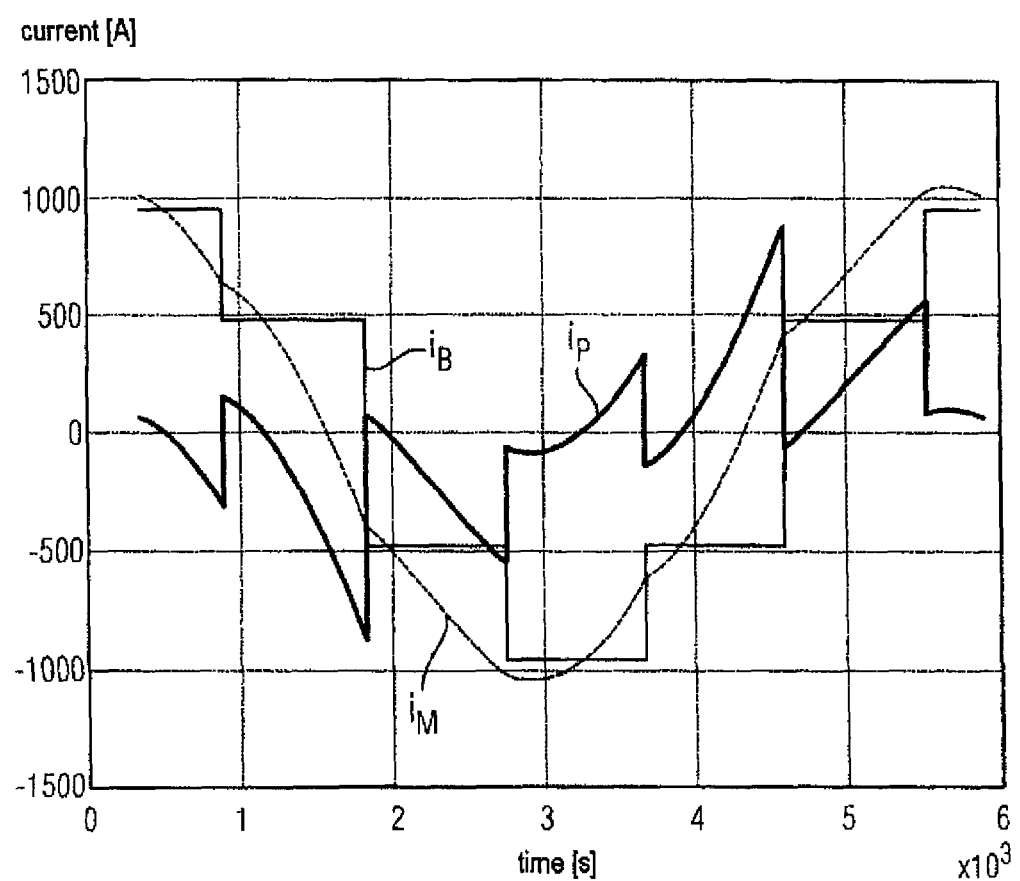

The power of the permanent-magnet synchronous generator 4 must therefore be equal to the sum of the power loss in the resistors 48 and 50 and the power of the auxiliary modes. The power loss in the resistors 48 and 50 is governed only by the root mean square value of the clocked voltage of the self-commutated pulse-controlled converters 10 and 12. The power of the permanent-magnet synchronous generator 4 is governed by the angle of the fundamental of this clocked voltage with respect to the rotor voltage of the permanent-magnet synchronous generator 4. In the graph shown in FIG. 7, a braking current $i_B$, a machine current $i_M$ and a converter current $i_P$ are shown, plotted against time, for 9-times clocking during the self-load test. In order to improve clarity, the waveform of the machine current $i_M$ is shown by means of an interrupted line, the waveform of the converter current $i_P$ is shown by means of a solid bold line, while in contrast the waveform of the braking current $i_B$ is shown by means of a solid line. In the graph shown in FIG. 8, the reactive current $i_B$, the machine current $i_M$ and the converter current $i_P$ are shown, plotted against time, for block clocking during the self-load test. This graph also shows the waveforms of the machine, converter and braking currents $i_M$, $i_P$ and $i_B$ using the indicated lines.

The use of a simple and low-cost switching apparatus 54 in conjunction with the splitting of each braking resistor 30 into two resistors 48 and 50, which are electrically connected in series, and the use of the existing generator-side self-commutated pulse-controlled converters 10 and 12 in the DC-link converter 6 in a diesel-electric drive system for closed-loop reactive-current control allows a self-load test on this drive system with closed-loop load torque control, in which the power semiconductors in the two self-commutated pulse-control converters 10 and 12 in the DC-link converter 6 in this drive system are not overloaded.

What is claimed is:

1. A diesel-electric drive system comprising:
a generator having a rotor mechanically coupled to a diesel engine and a stator having two polyphase winding systems;
a DC-link converter having two self-commutated pulse-controlled converters, wherein phases of each of the two polyphase winding systems are connected to corresponding phases on an AC voltage side of a corresponding self-commutated pulse-controlled converter, and wherein DC voltage sides of the two self-commutated pulse-controlled converters are connected in parallel to a DC-link capacitor of the DC-link converter;
two resistors connected in series between a phase on the AC voltage side of one of the two self-commutated pulse-controlled converters and a corresponding phase on the AC voltage side of the other pulse-controlled converter, and
a two-pole switching apparatus having a first switching state connecting the two resistors in each phase in series and a second switching state disconnecting the series connection of the two serially connected resistors in each phase and connecting the phases of each of the two polyphase winding systems separately via the resistors at a star point, so that the two polyphase winding systems are electrically decoupled from each other in the second switching state,
wherein each of the two serially-connected resistors has a resistance value equal to one half of a resistance value of an equivalent braking resistor.

2. The diesel-electric drive system of claim 1, wherein the generator comprises a permanent-magnet synchronous generator.

3. The diesel-electric drive system of claim 1, wherein the generator comprises an asynchronous generator.

4. The diesel-electric drive system of claim 1, wherein the DC-link capacitor comprises a capacitor bank.

5. The diesel-electric drive system of claim 1, wherein each of the two polyphase winding systems is connected to the AC voltage side of the corresponding self-commutated pulse-controlled converter by means of a circuit breaker.

6. A method for stationary load testing of a diesel engine of a diesel-electric drive system with a generator having a rotor mechanically coupled to a diesel engine and a stator having two polyphase winding systems, with a DC-link converter having two self-commutated pulse-controlled converters, wherein phases of each of the two polyphase winding systems are connected to corresponding phases on an AC voltage side of a corresponding self-commutated pulse-controlled converter, and wherein DC voltage sides of the two self-commutated pulse-controlled converters are connected in parallel to a DC-link capacitor of the DC-link converter, with two resistors connected in series between a phase on the AC voltage side of one of the two self-commutated pulse-controlled converters and a corresponding phase on the AC voltage side of the other pulse-controlled converter, and a two-pole switching apparatus having a first switching state connecting the two resistors in each phase in series and a second switching state disconnecting the series connection of the two serially connected resistors in each phase and connecting the phases of each of the two polyphase winding systems separately via the resistors at a star point, wherein each of the two serially-connected resistors has a resistance value equal to one half of a resistance value of an equivalent braking resistor, the method comprising the steps of:

switching the two-pole switching apparatus from the first state to the second state, synchronously clocking the two self-commutated pulse-controlled converters, and controlling the two self-commutated pulse-controlled converters so as to cause a predetermined reactive current to be generated from the charged DC-link circuit in the DC-link converter.

7. The method of claim 6, wherein the generator comprises a permanent-magnet synchronous generator.

8. The method of claim 6, wherein the generator comprises an asynchronous generator.

9. The method of claim 6, wherein the DC-link capacitor comprises a capacitor bank.

10. The method of claim 6, wherein each of the two polyphase winding systems is connected to the AC voltage side of the corresponding self-commutated pulse-controlled converter by means of a circuit breaker.

* * * * *